US012776688B2

(12) United States Patent
Matsumoto et al.

(10) Patent No.: US 12,776,688 B2
(45) Date of Patent: Oct. 27, 2026

(54) MOTOR DRIVE DEVICE, MOTOR SYSTEM AND ELECTRONIC DEVICE

(71) Applicant: ROHM CO., LTD., Kyoto (JP)

(72) Inventors: Kodai Matsumoto, Kyoto (JP); Moto Yamada, Kyoto (JP); Shigeru Hirata, Kyoto (JP)

(73) Assignee: Rohm Co., Ltd., Kyoto (JP)

( * ) Notice: Subject to any disclaimer, the term of this patent is extended or adjusted under 35 U.S.C. 154(b) by 768 days.

(21) Appl. No.: 18/153,033

(22) Filed: Jan. 11, 2023

(65) Prior Publication Data

US 2023/0253861 A1 Aug. 10, 2023

(30) Foreign Application Priority Data

Feb. 10, 2022 (JP) ................................ 2022-019432

(51) Int. Cl.

*H02K 11/21* (2016.01)
*H02K 11/215* (2016.01)
*H02K 11/33* (2016.01)
*H02K 29/08* (2006.01)

(52) U.S. Cl.

CPC ........... *H02K 11/215* (2016.01); *H02K 11/33* (2016.01); *H02K 29/08* (2013.01)

(58) Field of Classification Search

CPC .......... H02P 6/17; H02K 11/33; H02K 29/08; H02K 11/215

See application file for complete search history.

(56) References Cited

U.S. PATENT DOCUMENTS 6,836,085 B2 * 12/2004 Kawada .................. B60L 50/60 318/434
2020/0091843 A1 * 3/2020 Matsuda .................. H02P 6/16
2020/0366162 A1 * 11/2020 Yoshinaga ........... G01R 33/072

FOREIGN PATENT DOCUMENTS

CN 113452291 A * 9/2021 ................ H02P 7/04
JP 2017-175841 9/2017
JP 2017175841 A * 9/2017

OTHER PUBLICATIONS

JP-2017175841-A machine translation on Aug. 7, 2025.*
CN-113452291-A machine translation, Jan. 29, 2026.*
JP OA—Japanese Patent Office, Office Action in Japanese Appln. No. 2022-019432, dated Nov. 4, 2025, 33 pages (with English translation).

* cited by examiner

*Primary Examiner* — Leda T Pham
(74) *Attorney, Agent, or Firm* — Fish & Richardson P.C.

(57) ABSTRACT

The present disclosure provides a motor drive device. The motor drive device includes a terminal, a logic unit, a drive unit and a determination unit. The terminal is configured to receive a Hall signal output from a Hall sensor. The logic unit is configured to generate a control signal based on the Hall signal. The drive unit is configured to generate a driving signal based on the control signal. The determination unit is configured to determine a level of a voltage applied to the terminal. The logic unit is configured to switch a function setting based on a determination result of the determination unit.

13 Claims, 3 Drawing Sheets

MOTOR DRIVE DEVICE, MOTOR SYSTEM AND ELECTRONIC DEVICE

TECHNICAL FIELD

The present disclosure relates to a motor drive device, a motor system including the motor drive device, and an electronic device including the motor system.

BACKGROUND

Conventionally, various semiconductor integrated circuit devices (for example, referring to patent publication 1) have been developed as motor drive devices for driving motors. A semiconductor integrated circuit includes terminals (pins) used to establish external electrical connections.

PRIOR ART DOCUMENT

Patent Publication

[Patent document 1] Japan Patent Publication No. 2017-175841

SUMMARY

Problems to be Solved by the Present Disclosure

To achieve miniaturization and low costs of semiconductor integrated circuit devices, it is ideal that the number of terminals (pins) can be reduced. Thus, when a motor drive device is configured to set a certain function, it is ideal that the setting of the certain function can be carried out without increasing the number of terminals.

Technical Means for Solving the Problem

A motor drive device disclosed in the present application includes: a terminal configured to receive a Hall signal output from a Hall sensor; a logic unit configured to generate a control signal based on the Hall signal; a drive unit configured to generate a driving signal based on the control signal; and a determination unit configured to determine a level of a voltage applied to the terminal, wherein the logic unit is configured to switch a function setting based on a determination result of the determination unit. The logic unit is configured to switch a function setting based on a determination result of the determination unit.

A motor system disclosed in the present application includes a motor drive device of the above configuration, the Hall sensor, and a motor configured to be driven by the motor drive device.

An electronic device disclosed by the present application includes the motor system of the above configuration.

Effects of the Disclosure

According to the disclosure of the present application, a function setting can be performed without increasing the number of terminals.

DETAILED DESCRIPTION OF THE EMBODIMENTS

In the disclosure, a constant voltage refers to a voltage that is kept fixed in an ideal state, and is in practice a voltage that may slightly vary in response to temperature changes.

In the present disclosure, a metal-oxide-semiconductor field-effect transistor (MOSFET) refers to a field-effect transistor (FET) in which a gate has at least three layers including "a layer containing a conductor or a semiconductor such as polysilicon with a small resistance value", "an insulating layer", and "a P-type, N-type or intrinsic semiconductor layer". That is to say, the gate structure of the MOSFET is not limited to the structure of the three layers including metal, oxide and semiconductor.

Figure 1:
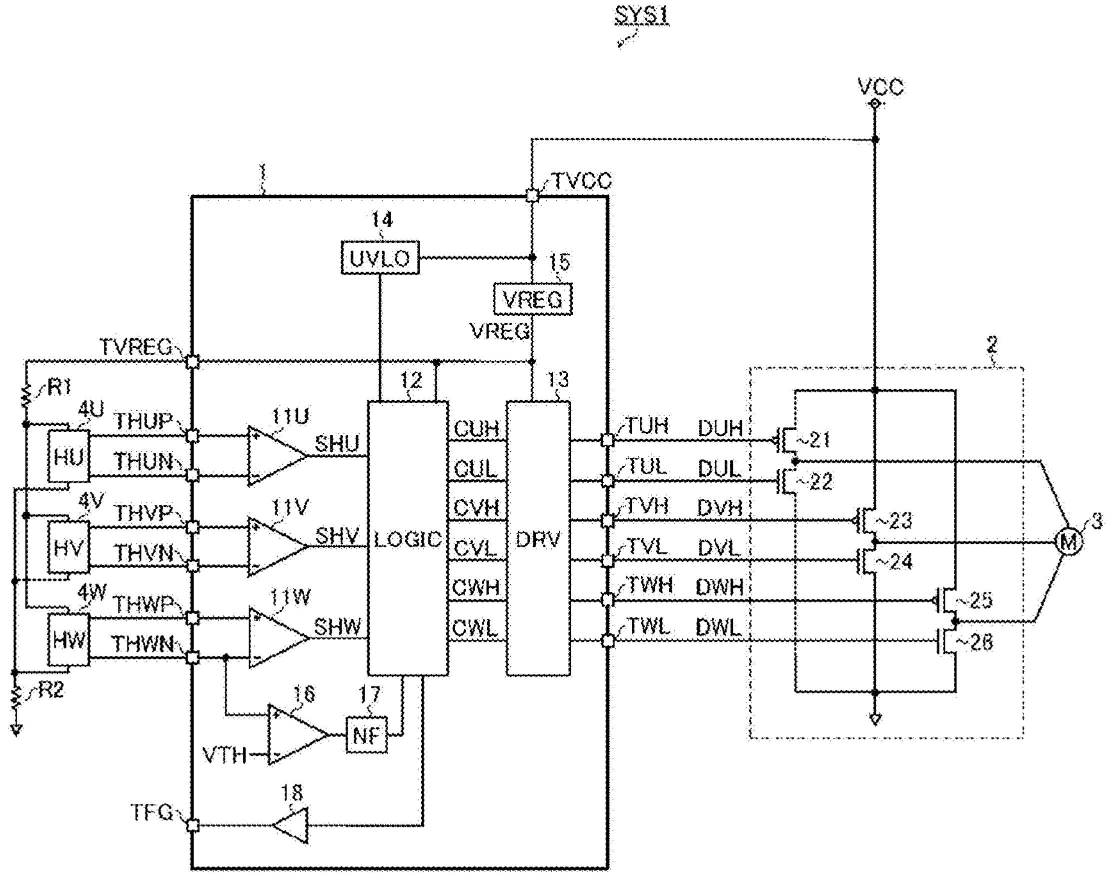
FIG. 1 is a diagram of configuration of a motor system according to an embodiment.

FIG. 1 shows a diagram of configuration of a motor system SYS1 according to an embodiment. The motor system SYS1 of the embodiment includes a motor drive device 1, an inverter 2, a three-phase brushless direct-current (DC) motor 3, Hall sensors 4U, 4V and 4W, and resistors R1 and R2.

The motor drive device 1 drives the three-phase brushless DC motor 3 through the inverter 2 based on Hall signals output from the Hall sensors 4U, 4V and 4W. The inverter 2 includes P-channel MOSFETs 21, 23 and 25, and N-channel MOSFETs 22, 24 and 26. A connection node of the MOSFET 21 and the MOSFET 22 is connected to a U phase of the three-phase brushless DC motor 3. A connection node of the MOSFET 23 and the MOSFET 24 is connected to a V phase of the three-phase brushless DC motor 3. A connection node of the MOSFET 25 and the MOSFET 26 is connected to a W phase of the three-phase brushless DC motor 3. Moreover, the inverter 2 may also be built-in the motor drive device 1. In addition, for example, N-channel MOSFETs may be used in substitution for the P-channel MOSFETs 21, 23 and 25. When N-channel MOSFETs are used in substitution for the P-channel MOSFETs 21, 23 and 25, by providing a charge pump circuit in the motor drive device 1, a power supply voltage of a drive unit 13 can become an output voltage of the charge pump circuit.

The motor drive device 1 is a semiconductor integrated circuit device. The motor drive device 1 includes comparators 11U, 11V and 11W, a logic unit 12, a drive unit 13, an under-voltage lock-out (UVLO) unit 14, a constant voltage generator 15, a comparator 16, a noise filter 17 and an amplifier 18. The motor drive device 1 includes a terminal TVCC, a terminal TVREG, a terminal THUP, a terminal THUN, a terminal THVP, a terminal THVN, a terminal THWP, a terminal THWN, a terminal TUH, a terminal TUL, a terminal TVH, a terminal TVL, a terminal TWH, a terminal TWL and a terminal TFG as external terminals used to establish external electrical connections.

The comparator 11U is a comparator with hysteresis, and amplifies the Hall signal with a positive/negative polarity output from the U-phase Hall sensor 4U to generate a U-phase position detection signal SHU.

The comparator 11V is a comparator with hysteresis, and differentially amplifies the Hall signal with a positive/negative polarity output from the V-phase Hall sensor 4V to generate a V-phase position detection signal SHV.

The comparator 11W is a comparator with hysteresis, and differentially amplifies the Hall signal with a positive/ negative polarity output from the W-phase Hall sensor 4W to generate a W-phase position detection signal SHW.

The logic unit 12 generates control signals CUH, CUL, CVH, CVL, CWH and CWL of respective phases by means of changing a direction at switching timings corresponding to the position detection signals SHU, SHV and SHW of the respective phases, so as to perform power control of the three-phase brushless DC motor 3.

The drive unit 13 performs predetermined signal processing such as level shifting and waveform shaping on the control signals CUH, CUL, CVH, CVL, CWH and CWL of respective phases output from the logic unit 12, accordingly generating driving signals DUH, DUL, DVH, DVL, DWH and DWL of the respective phases. The drive unit 13 outputs the driving signals DUH, DUL, DVH, DVL, DWH and DWL of the respective phases to the inverter 2 through the terminal TUH, the terminal TUL, the terminal TVH, the terminal TVL, the terminal TWH and the terminal TWL.

The UVLO unit 14 monitors the power supply voltage VCC supplied to the terminal TVCC, and cancels a UVLO when the power supply voltage VCC reaches a predetermined UVLO release voltage. While the UVLO is not canceled, the logic unit 12 generates the control signals CUH, CUL, CVH, CVL, CWH and CWL of the respective phases that turn off all of the MOSFETs 21 to 26 in the inverter 2.

The constant voltage generator 15 generates a constant voltage VREG (for example, 5 V) from the power supply voltage VCC, and supplies to the constant voltage VREG to each unit of the motor drive device 1. In addition, the constant voltage VREG is output from the terminal TVREG to outside the motor drive device 1.

The comparator 16 performs a binary level determination on a voltage applied to the terminal THWN. When the voltage applied to the terminal THWN is greater than a threshold VTH, the comparator 16 determines that the voltage applied to the terminal THWN is at a high level (HIGH), and outputs a high-level signal. On the other hand, when the voltage applied to the terminal THWN is not greater than the threshold VTH, the comparator 16 determines that the voltage applied to the terminal THWN is at a low level (LOW), and outputs a low-level signal. The threshold VTH is generated by, for example, dividing the constant voltage VREG in the motor drive device 1.

The noise filter 17 performs de-noising on the output signal of the comparator 16, and supplies a de-noised output signal of the comparator 16 to the logic unit 12.

In addition to performing the above power control, the logic unit 12 further generates a rotational speed detection signal (also referred to as a frequency generator (FG) signal) SFG according to the phase detection signals SHU, SHV and SHW of the respective phases. The frequency of the rotational speed detection signal SFG changes correspondingly to the rotational speed of the three-phase brushless DC motor 3. The rotational speed detection signal SFG is amplified by the amplifier 18, and is output from the terminal TFG to outside the motor drive device 1. For example, a microcomputer that is not shown may monitor the rotational speed detection signal SFG to stay aware of the rotational speed of the three-phase brushless DC motor 3.

The logic unit 12 switches a setting of the number of output pulses of the rotational speed detection signal SFG according to a determination result of the comparator 16. When the output signal of the comparator 16 is at a high level, the logic unit 12 sets the number of output pulses of the rotational speed detection signal FG to 12 pulses (combined from three phases). On the other hand, when the output signal of the comparator 16 is at a low level, the logic unit 12 sets the number of output pulses of the rotational speed detection signal FG to 4 pulses (only one phase).

Figure 2:
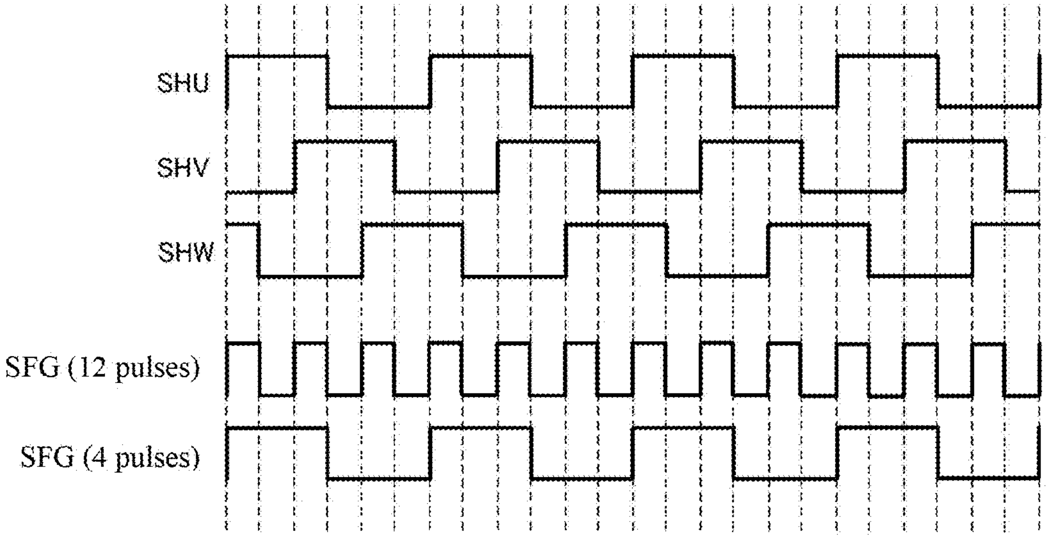
FIG. 2 is a timing diagram of a position detection signal and a rotational speed detection signal.

When the number of output pulses of the rotational speed detection signal SFG is set to 12 pulses, the logic unit 12 generates the rotational speed detection signal SFG according to any of an exclusive-or logical sum or an exclusive-nor logical sum of the position detection signals SHU, SHV, and SHW of the respective phases (referring to a timing diagram in FIG. 2). On the other hand, when the number of output pulses of the rotational speed detection signal SFG is set to 4 pulses, the logic unit 12 sets the U-phase position detection signal SHU as the rotational speed detection signal SFG.

To inhibit malfunctions related to switching a function setting in the logic unit 12, it is ideal that the logic unit 12 switches the setting of the number of output pulses of the rotational speed detection signal SFG according to the determination result of the comparator 16 after the UVLO unit 14 releases the UVLO.

Moreover, to inhibit malfunctions related to switching a function setting in the logic unit 12, it is ideal that logic unit 12 determines the determination result of the comparator 16 according to a predetermined cycle, and switches the setting of the number of output pulses of the rotational speed detection signal SFG according to the determination result of the comparator 16 when the determination result of the comparator 16 is the same for a predetermined number of consecutive times (for example, 4 times).

Next, the Hall sensors 4U, 4V and 4W are described below. The Hall sensors 4U, 4V and 4W are connected in parallel. A first end of the resistor R1 is connected to the terminal VREG. Thus, the constant voltage VREG is applied to the first end of the resistor R1. A second end of the resistor R2 is connected to respective first ends of the Hall sensors 4U, 4V and 4W. Respective second ends of the Hall sensors 4U, 4V and 4W are connected to a first end of the resistor R2. A second end of the resistor R2 is connected to a ground terminal.

Bias voltage values of the Hall signals output from the Hall sensors 4U, 4V and 4W are determined by a value of the constant voltage VREG and a voltage dividing ratio of the resistors R1 and R2 acting as voltage dividing resistors. Thus, in the motor system SYS1 of the embodiment, without increasing the number of parts, the number of output pulses of the rotational speed detection signal FG can be switched by merely adjusting resistance values of the resistors R1 and R2.

For example, when the value of the constant voltage VREG is set to 5 V, the resistance value of the resistor R1 is set to 150Ω and the resistance value of the resistor R2 is set to 150Ω, the bias voltage value of the Hall signals becomes 2.5 V (=5*150/(150+150)). In this case, the number of output pulse of the rotational speed detection signal FG becomes 12 pulses.

In addition, for example, when the value of the constant voltage VREG is set to 5 V, the resistance value of the resistor R1 is set to 240Ω and the resistance value of the resistor R2 is set to 51Ω, the bias voltage value of the Hall signals becomes 0.88 V (=5*51/(240+51)). In this case, the number of output pulse of the rotational speed detection signal FG becomes 4 pulses.

Figure 3:
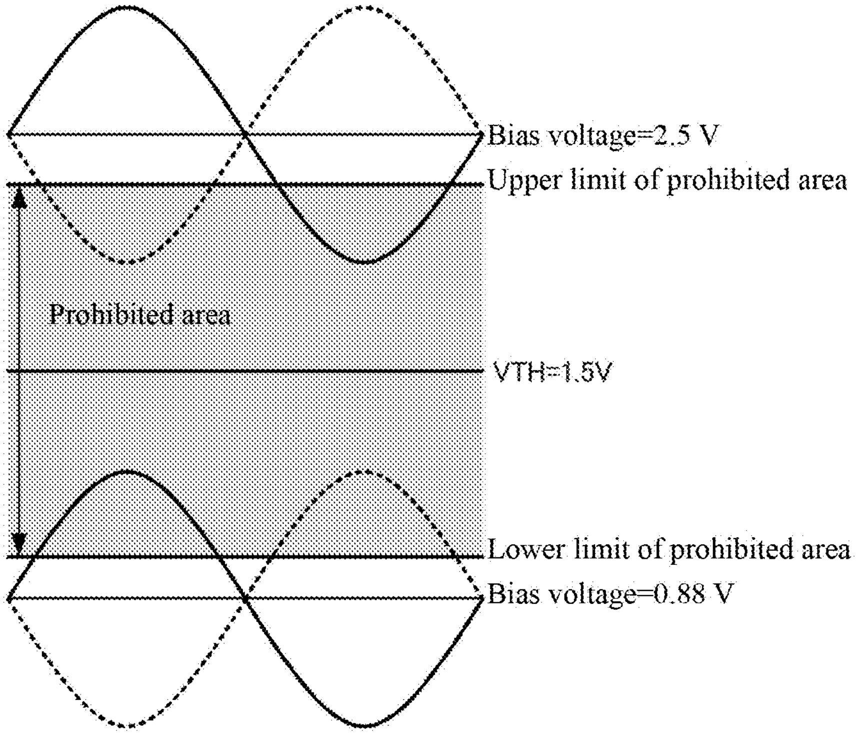
FIG. 3 is a diagram of a prohibited area.

As shown in FIG. 3, a bias voltage of the Hall signals is set to be out of a prohibited area including the threshold VTH. Moreover, in FIG. 3, a sine wave in a solid line represents a Hall signal of a positive polarity, and a sine wave in a dotted line represents a Hall signal of a negative polarity. An upper limit of the prohibited area is a value obtained by adding the amplitude of the Hall signals and a predetermined margin (for example, 100 mV) to the threshold VTH. A lower limit of the prohibited area is a value obtained by subtracting the amplitude of the Hall signals and the predetermined margin (for example, 100 mV) from the threshold VTH. According to the above setting, when the bias voltage value of the Hall signals is greater than the threshold VTH, a minimum of the Hall signals is greater than the threshold VTH; when the bias voltage value of the Hall signals is less than the threshold VTH, a maximum value of the Hall signals is less than the threshold VTH. Thus, regardless of the position of a rotor of the three-phase brushless DC motor 3, a binary level determination can be performed by using the comparator 16.

Figure 4:
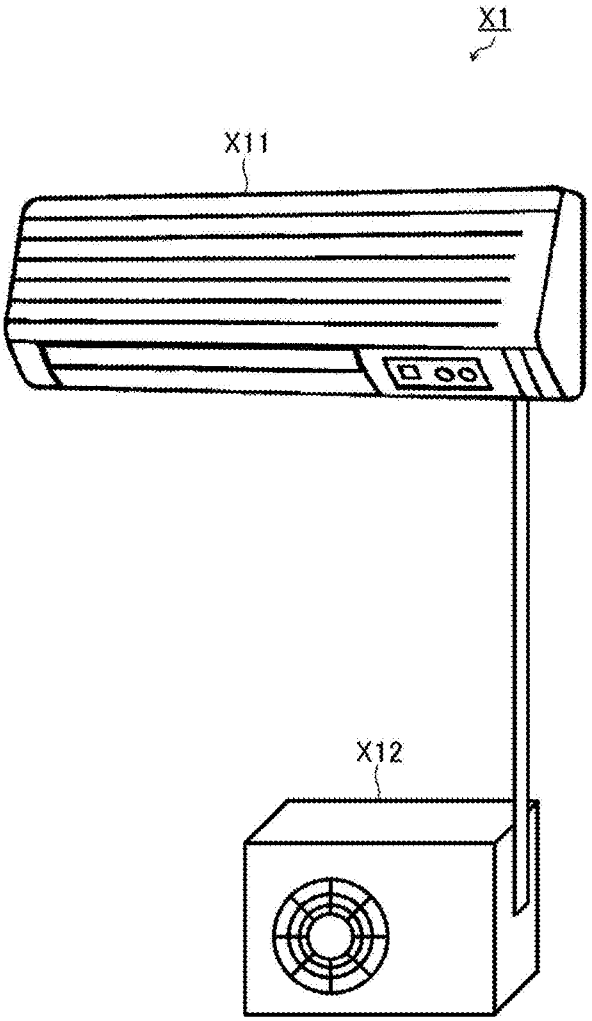
FIG. 4 is a perspective diagram of an appearance of an air conditioner.

The above motor system SYS1 may be mounted in an air conditioner X1 shown in FIG. 4. The air conditioner X1 includes an indoor unit X11 and an outdoor unit X12. The three-phase brushless DC motor 3 of the above motor system SYS1 may be used as, for example, a fan motor of the indoor unit X11. In addition, the three-phase brushless DC motor 3 of the above motor system SYS1 may also be used as, for example, a fan motor of the outdoor unit X12.

The above motor system SYS1 may also be mounted in an electronic device other than air conditioners. An electronic device other than air conditioners may be, for example, an air purifier, a hot water supply pump, a dishwasher or a washing machine.

In addition to the embodiments, various modifications may be made to the various technical features disclosed by the present disclosure without departing from the scope of the technical inventive subject thereof. That is, it should be considered that all aspects of the embodiment are exemplary rather than restrictive, and it should be understood that the technical scope of the present disclosure is represented by way of the claims but not the non-limiting embodiments, including all equivalent meanings and variations made within the scope accorded with the claims.

For example, in the above embodiments, the function setting switched by the logic unit 12 is the number of output pulses of the rotational speed detection signal FG, but may also be switching settings of other functions. The settings of other functions may by, for example, a setting of a direction of rotation (forward rotation/reverse rotation) of the three-phase brushless DC motor 3, and a setting of whether phase control (lead angle control) of the control signals CUH, CUL, CVH, CVL, CWH and CWL of the respective phases is to be performed.

For example, in the above embodiments, the level determination of the voltage applied to the terminal THWN is performed; however, other than the terminal THWN, a level determination may also be performed for a voltage applied to any one of the terminals (the terminal THUP, the terminal THUN, the terminal THVP, the terminal THVN and the terminal THWP) that receive the Hall signals.

For example, in the above embodiments, a binary level determination is performed on the voltage applied to a terminal that receives the Hall signal; however, the level determination performed on the voltage applied to the terminal that receives the Hall signal may also be a level determination of three levels or more. When a three-level determination is performed, for example, two comparators used for the level determination may be provided.

For example, in the above embodiments, the motor drive device drives a three-phase brushless DC motor; however, the motor driven by the motor drive device may also be a motor other than a three-phase brushless DC motor.

A motor drive device (1) described above is configured (as a first configuration) to include: a terminal (THWN) configured to receive a Hall signal output from a Hall sensor (4W); a logic unit (12) configured to generate a control signal based on the Hall signal; a drive unit (13) configured to generate a driving signal based on the control signal; and a determination unit (16) configured to determine a level of a voltage applied to the terminal, wherein the logic unit is configured to switch a function setting based on a determination result of the determination unit.

The motor drive device of the first configuration is capable of performing function setting without increasing the number of terminals.

The motor drive device of the first configuration may also be configured (as a second configuration) to include: an under-voltage lock-out (UVLO) unit (14) configured to monitor a power supply voltage supplied to the motor drive device and release a UVLO when the power supply voltage reaches a predetermined UVLO release voltage, wherein the logic unit is configured to switch the function setting based on the determination result after the UVLO is canceled by the UVLO unit.

The motor drive device of the second configuration is capable of inhibiting malfunctions related to switching of a function setting in the logic unit.

The motor drive device of the second configuration may also be configured (as a third configuration) to switch, by the logic unit, the function setting based on the determination result when the determination result of the determination unit is the same for a predetermined number of consecutive times.

The motor drive device of the third configuration is capable of inhibiting malfunctions related to switching of a function setting in the logic unit.

The motor drive device of any one of the first to third configurations may also be configured (as a fourth configuration) as the function setting being a setting of a number of output pulses of a rotational frequency detection signal.

The motor drive device of the fourth configuration is capable of switching the number of output pulses of the rotational frequency detection signal.

The motor drive device of any one of the first to third configurations may also be configured (as a fifth configuration) as, the function setting being a setting of a direction of rotation.

The motor drive device of the fifth configuration is capable of switching a direction of rotation of the motor.

A motor system (SYS1) described above may be configured (as a sixth configuration) to include a motor drive device of any one of the first to fifth configurations, the Hall sensor, and a motor (3) configured to be driven by the motor drive device.

The motor system of the sixth configuration is capable of performing a function setting without increasing the number of terminals in the motor drive device.

The motor system of the sixth configuration may also be configured (as a seventh configuration) as a bias voltage of a Hall signal being set to be out of a prohibited area including a threshold value of a level determination.

The motor system of the seventh configuration is capable of performing a level determination by a determination unit regardless of the position of a rotor of the motor.

An electronic device (X1) described above may be configured (as an eighth configuration) to include the motor system of the sixth or seventh configuration.

The electronic device of the eighth configuration is capable of performing a function setting without increasing the number of terminals in a motor drive device.

The invention claimed is:

1. A motor drive device, comprising:

a terminal configured to receive a Hall signal output from a Hall sensor;

a logic unit configured to generate a control signal based on the Hall signal;

a drive unit configured to generate a driving signal based on the control signal; and a determination unit configured to determine a voltage level of the Hall signal with respect to a threshold voltage, wherein the logic unit is configured to switch a function setting based on a determination result of the determination unit, and wherein the threshold voltage is based on a constant voltage, wherein the logic unit is configured to switch the function setting based on the determination result of the determination unit being the same for a predetermined number of consecutive times, wherein the predetermined number of consecutive times is greater than 1.

2. The motor drive device of claim 1, further comprising:

an undervoltage-lockout (UVLO) unit configured to monitor a power supply voltage supplied to the motor drive device and release a UVLO when the power supply voltage reaches a predetermined UVLO release voltage, wherein the logic unit is configured to switch the function setting based on the determination result after the UVLO is canceled by the UVLO unit.

3. The motor drive device of claim 2, wherein the function setting is a setting of a number of output pulses of a rotational frequency detection signal.

4. The motor drive device of claim 2, wherein the function setting is a setting of a direction of rotation.

5. A motor system, comprising:

a motor drive device of claim 2;

the Hall sensor; and a motor configured to be driven by the motor drive device.

6. The motor drive device of claim 1, wherein the function setting is a setting of a number of output pulses of a rotational frequency detection signal.

7. A motor system, comprising:

a motor drive device of claim 6;

the Hall sensor; and a motor configured to be driven by the motor drive device.

8. The motor drive device of claim 1, wherein the function setting is a setting of a direction of rotation.

9. A motor system, comprising:

a motor drive device of claim 8;

the Hall sensor; and a motor configured to be driven by the motor drive device.

10. A motor system, comprising:

a motor drive device of claim 1;

the Hall sensor; and a motor configured to be driven by the motor drive device.

11. The motor system of claim 10, wherein a bias voltage of a Hall signal is set to be out of a prohibited area including a threshold value of a level determination.

12. An electronic device, comprising the motor system of claim 11.

13. An electronic device, comprising the motor system of claim 10.

* * * * *